(12) United States Patent
Srinivasan et al.

(10) Patent No.: US 7,272,300 B2
(45) Date of Patent: Sep. 18, 2007

(54) METHOD AND APPARATUS FOR STORING CONTENT

(75) Inventors: Jai Srinivasan, Kirkland, WA (US);
Matthijs A. Gates, Wellesley, MA (US); Mukund Sankaranarayan, Issaquah, WA (US); Alok Chakrabarti, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/048,401

(22) Filed: Feb. 1, 2005

(65) Prior Publication Data

US 2005/0141886 A1 Jun. 30, 2005

Related U.S. Application Data

(63) Continuation of application No. 09/896,902, filed on Jun. 28, 2001.

(60) Provisional application No. 60/273,943, filed on Mar. 5, 2001.

(51) Int. Cl.
*H04N 5/91* (2006.01)

(52) U.S. Cl. .......................................... 386/95; 386/125

(58) Field of Classification Search .................. 386/46, 386/52, 68, 83, 95, 125, 126; 360/5
See application file for complete search history.

(56) References Cited

U.S. PATENT DOCUMENTS

| 4,982,390 | A | 1/1991 | Tanaka |
| 5,282,092 | A | 1/1994 | Wilhelms |
| 5,438,423 | A | 8/1995 | Lynch et al. |
| 5,611,066 | A | 3/1997 | Keele et al. |
| 5,627,936 | A | 5/1997 | Prasad et al. |
| 5,659,674 | A | 8/1997 | Doyle et al. |
| 5,774,186 | A | 6/1998 | Brodsky et al. |
| 5,915,094 | A | 6/1999 | Kouloheris et al. |
| 5,987,257 | A | 11/1999 | Whitten |
| 5,990,899 | A | 11/1999 | Whitten |
| 6,034,738 | A | 3/2000 | Sparks |
| 6,065,042 | A | 5/2000 | Reimer et al. |
| 6,208,804 | B1 | 3/2001 | Ottesen et al. |
| 6,311,011 | B1 | 10/2001 | Kuroda |
| 6,327,418 | B1 | 12/2001 | Barton |
| 6,351,595 | B1 | 2/2002 | Kim |

(Continued)

FOREIGN PATENT DOCUMENTS

DE 198 44 635 A1 4/1999

(Continued)

OTHER PUBLICATIONS

Tsukamoto, Yuji et al., "Development of Home Video Server 'Digital Video Station,'" NEC Research & Development, 2000, V 41, N2 (Apr), pp. 156-159.

(Continued)

*Primary Examiner*—Huy Nguyen

(57) ABSTRACT

A system receives a broadcast program and temporarily stores the program data. A request is received to permanently record the broadcast program. This request is received after a portion of the broadcast program has been received and temporarily stored. The broadcast program is then permanently recorded, including the temporarily stored program data. A metafile identifies portions of the broadcast program and is accessible by a reader to continuously retrieve the stored portions of the broadcast program.

10 Claims, 9 Drawing Sheets

U.S. PATENT DOCUMENTS

| | | |
|---|---|---|
| 6,360,053 B1 | 3/2002 | Wood et al. |
| 6,628,890 B1 | 9/2003 | Yamamoto et al. |
| 6,642,939 B1 | 11/2003 | Vallone et al. |
| 6,678,463 B1 | 1/2004 | Pierre et al. |
| 6,741,789 B1 | 5/2004 | Hoshi |
| 6,985,669 B1 * | 1/2006 | Unger ............... 386/46 |
| 2003/0051136 A1 | 3/2003 | Curtis |

FOREIGN PATENT DOCUMENTS

| | | |
|---|---|---|
| EP | 0 903 738 A2 | 3/1999 |
| EP | 0 924 927 A2 | 6/1999 |
| EP | 1028588 | 8/2000 |
| EP | 1 162 839 A2 | 12/2001 |
| EP | 1 206 132 A2 | 5/2002 |
| EP | 1 244 295 A2 | 9/2002 |
| JP | 2000 224543 A | 8/2000 |
| WO | WO9222983 | 12/1992 |
| WO | WO 00/33568 | 6/2000 |
| WO | WO 00/40021 | 7/2000 |
| WO | WO 00/60590 | 10/2000 |
| WO | WO 01/11865 A1 | 2/2001 |
| WO | WO 01/15451 A1 | 3/2001 |
| WO | WO 01/35405 A1 | 5/2001 |
| WO | WO0176249 | 10/2001 |
| WO | WO0182588 | 11/2001 |
| WO | WO0203683 | 1/2002 |
| WO | WO0228097 | 4/2002 |

OTHER PUBLICATIONS

Chang, Edward Y., "Maximizing QoS for interactive DTV clients," Computer Communications vol. 23, No. 3, (2000), pp. 205-218.

An, Sang Ju et al., "A Video Encoder/Decoder Architecture for Consumer-Use HD-DVCRs," IEEE Transactions of Consumer Electronics, vol. 43, No. 3, Aug. 1997, pp. 352-359.

* cited by examiner

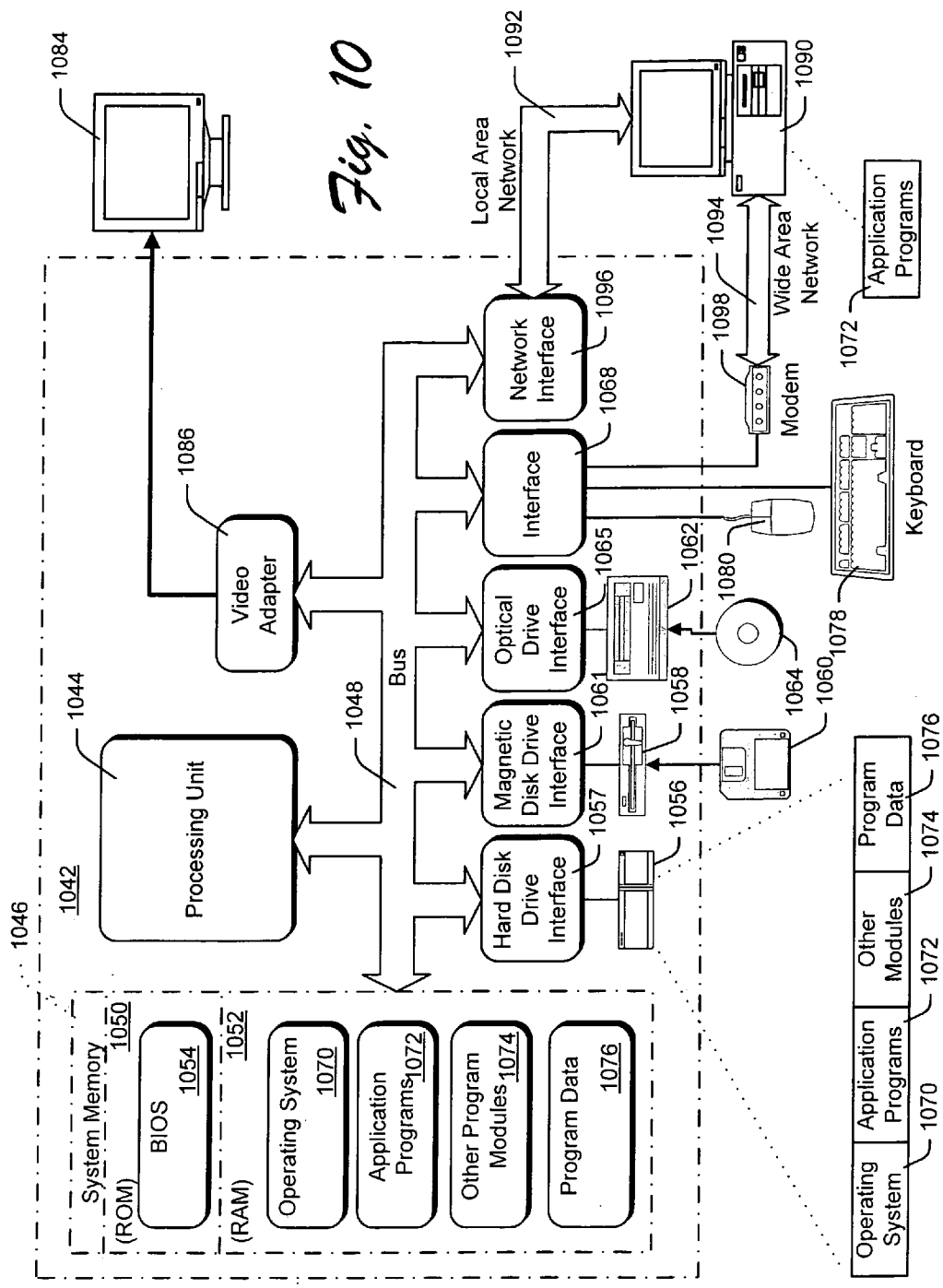

METHOD AND APPARATUS FOR STORING CONTENT

RELATED APPLICATIONS

This application is a Continuation of co-pending application Ser. No. 09/896,902, filed Jun. 28, 2001, entitled "Method and Apparatus for Storing Content", and incorporated herein by reference.

That application claims the benefit of U.S. Provisional Application No. 60/273,943 filed Mar. 5, 2001, the disclosure of which is also incorporated herein by reference.

TECHNICAL FIELD

The present invention relates to data recording systems and, more particularly, to a system that provides a unified time shifting and digital recording solution and that is capable of post-recording data that was previously stored as time shifted data.

BACKGROUND

Time shifting is the ability to perform various operations on a broadcast stream of data; i.e., a stream of data that is not flow-controlled. Example broadcast streams include digital television broadcasts, digital radio broadcasts, and Internet Protocol (IP) multicasts across a network, such as the Internet. A broadcast stream of data may include video data and/or audio data. Time shifting allows a user to "pause" a live broadcast stream of data without loss of data. Time shifting also allows a user to seek forward and backward through a stream of data, and play back the stream of data forward or backward at any speed. This time shifting is accomplished using a storage device, such as a hard disk drive, to store a received stream of data. The received stream of data is typically saved to a temporary file on the hard disk drive. The available storage space for the temporary file is typically limited such that the old content of the temporary file is discarded periodically (and possibly continuously) to release storage space for new data.

A DVR (digital video recorder or digital VCR) provides for the long term storage of a stream of data, such as a television broadcast. This long term storage of data may be referred to as digital recording. A digital recording creates a permanent archive of the data stream such that the user can view the broadcast at a later time. A DVR also uses a storage device, such as a hard disk drive, to store a received stream of data. A time shifting system and a digital recording system may share a common storage device to store data associated with one or more data streams. Existing digital recording systems require the user to schedule the recording in advance (i.e., before the broadcast begins) or create the recording from the current time onward. These existing systems cannot record content that has already been streamed to them. Attempting to copy data from a temporary file into a permanent long term storage file is time consuming and requires significant processing and storage resources, especially if a broadcast is being time shifted or digitally recorded simultaneously.

FIG. 1 illustrates an exemplary prior art system that stores time shifted data and permanently recorded data on a storage device 110. A time shifting system 102 stores time shifted data in a temporary file 104 on the storage device 110. A digital recording system 106 stores digitally recorded data in one or more recorded files 108 on the storage device 110. As shown in FIG. 1, the temporary file 104 is separate from the recorded files 108, thereby allowing the temporary file to be discarded without affecting the recorded files. Old content in the temporary file may be discarded to provide storage space for newly received content or one or more new recorded files.

The system illustrated in FIG. 1 uses one temporary file 104 to store all time shifted data. A single temporary file is undesirable because the time shifting operations and the digital recording operations are not unified. Instead, the temporary file and the recorded files are processed separately. For example, suppose a use is viewing a live television broadcast and a pre-scheduled digital recording starts at 8:30. If a single temporary file is used for time shifting, the user cannot seek to a time prior to 8:30 once the digital recording has started. Similarly, if the digital recording ends at 9:00, it is not possible for the user to seek to a time prior to 9:00 once the digital recording has ended. The system of FIG. 1 is limited to accessing one file at a time—either the temporary file 104 when time shifting or one of the recorded files 108 when digitally recording.

The systems and methods described herein address the above limitations by providing a system that provides an architecture that supports multiple files and unifies the time shifting and digital recording operations. Moreover, the time shifting and digital recording system allows a user to post-record a previously viewed data stream. These systems and methods also allow for the overlapped recording of a data stream.

SUMMARY

The systems and methods described herein provide a unified time shifting and digital recording solution including a data storage format that links together temporary media content files (i.e., time shifted data files) and permanent media content files (i.e., digitally recorded data files). This solution allows a user to post-record; i.e., retrospectively record previously viewed data streams. The solution also allows a user to create overlapped recordings of a data stream. For example, a user can record an entire program as well as one or more highlights or portions of the program and access them independently of one another. These solutions do not require copying or redundantly storing the streamed data, thereby avoiding an unnecessary use of resources.

In one embodiment, a portion of a broadcast program is stored as time shifted data. The time shifted data is retrieved and displayed. A request is received to record the broadcast program as recorded data after a portion of the time shifted data has been stored. The broadcast program is then recorded.

In another embodiment, a first portion of a broadcast data stream is stored as a time shifted data file. A second portion of the broadcast data stream is stored as a recorded data file. A metafile is created that identifies the first portion of the broadcast data stream and the second portion of the broadcast data stream. The metafile is accessible by a reader to continuously retrieve the first portion of the broadcast data stream and the second portion of the broadcast data stream.

A particular embodiment stores a broadcast data stream in a data file. At least part of the broadcast data stream is stored as time shifted data. A first metafile associated with a first portion of the data file is created along with a second metafile associated with a second portion of the data file. The first metafile and the second metafile include a common portion of the data file.

BRIEF DESCRIPTION OF THE DRAWINGS

FIG. 10 illustrates an example of a suitable operating environment in which the systems and methods described herein may be implemented.

DETAILED DESCRIPTION

The systems and methods described herein provide a unified time shifting and digital recording solution including a data storage format that links together temporary media content files (i.e., time shifted data files) and permanent media content files (i.e., digitally recorded data files). The storage scheme described herein stores streamed content (also referred to as streamed data) to one or more media files. Each media file stores a particular amount of streamed content (e.g., ten minutes of program content). A metafile is used to keep track of the order of the media files and sequence the media content. The metafile represents both the time shifted data and the recorded data that comprise one or more broadcast programs. This approach permits the efficient creation of permanent recordings without duplicating the media content and offers features such as post-recording and overlapped recordings, discussed herein. The metafile also allows the user to seamlessly access multiple media content files associated with the metafile, regardless of whether the media content files are permanent or temporary.

The systems and methods described herein can operate with various streaming multimedia applications, such as Microsoft® DirectShow® application programming interface available from Microsoft Corporation of Redmond, Wash. Although particular examples are described with respect to the DirectShow® multimedia application, other multimedia applications and application programming interfaces can be used in a similar manner to provide the described time shifting and digital recording functionality.

As used herein, the term "broadcast data" refers to any stream of data, such as television broadcasts, radio broadcasts, and Internet Protocol (IP) multicasts across a network, such as the Internet, and multimedia data streams. A broadcast stream of data may include any type of data, including combinations of different types of data, such as video data and audio data. Broadcast data may be received from any number of data sources via any type of communication medium.

Figure 1:
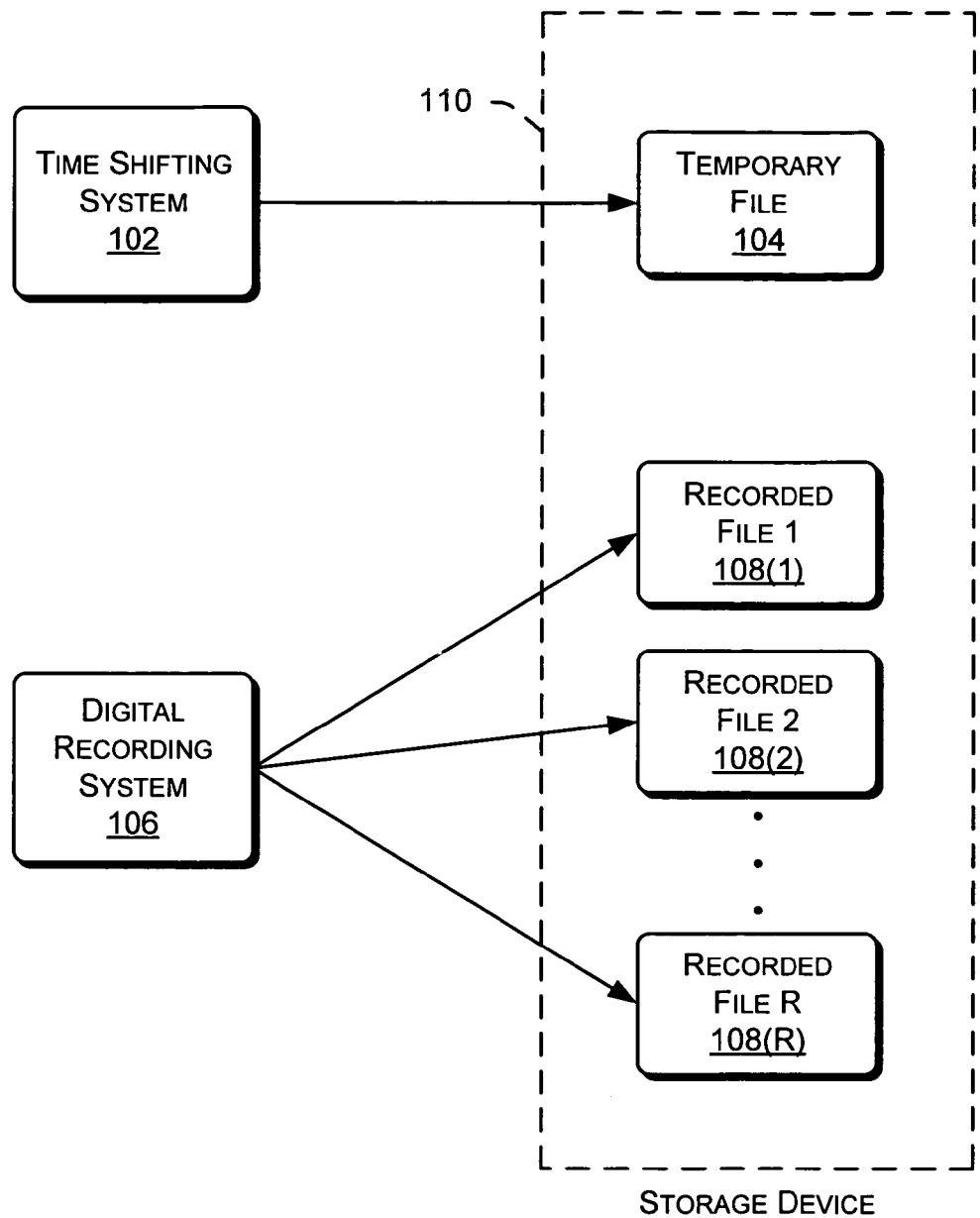
FIG. 1 illustrates an exemplary prior art system that stores time shifted data and recorded data on a storage device.
Figure 2:
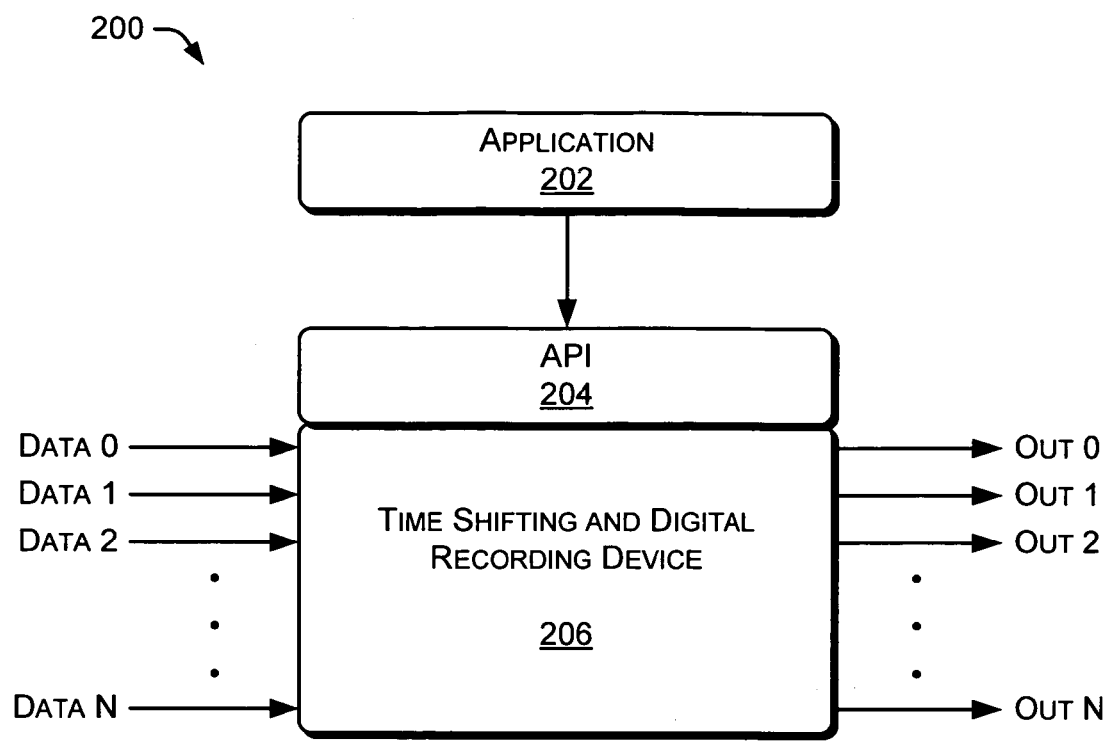
FIG. 2 illustrates a block diagram of a system capable of time shifting and/or recording multiple streams of broadcast data.

FIG. 2 illustrates a block diagram of a system 200 capable of time shifting and/or recording multiple streams of broadcast data. An application 202 communicates through an application programming interface (API) 204 to a time shifting and digital recording device 206. Time shifting and digital recording device 206 receives (or captures) data from one or more broadcast data streams, labeled Data 0, Data 1, Data 2, . . . , Data N. Different data streams may originate from different data sources, contain different types of data, and utilize different formats (e.g., different encoding algorithms). One or more output data streams can be generated by time shifting and digital recording device 206. These output data streams are labeled Out 0, Out 1, Out 2, . . . , Out N. The output data streams may be from the same broadcast and provided to one or more users. For example, Out 0 may be providing data from the beginning of a multimedia presentation to a first user while Out 1 is providing data from the middle of the same multimedia presentation to a second user. Alternatively, the output data streams may be associated with different broadcasts stored by the time shifting and digital recording device 206. For example, Out 1 may be providing data from a television broadcast to a first user while Out 2 is providing data from a multimedia presentation to a second user. In one implementation, each broadcast is handled by a separate instance of the device. Additional details regarding the operation of time shifting and digital recording device 206 are provided below.

Figure 3:
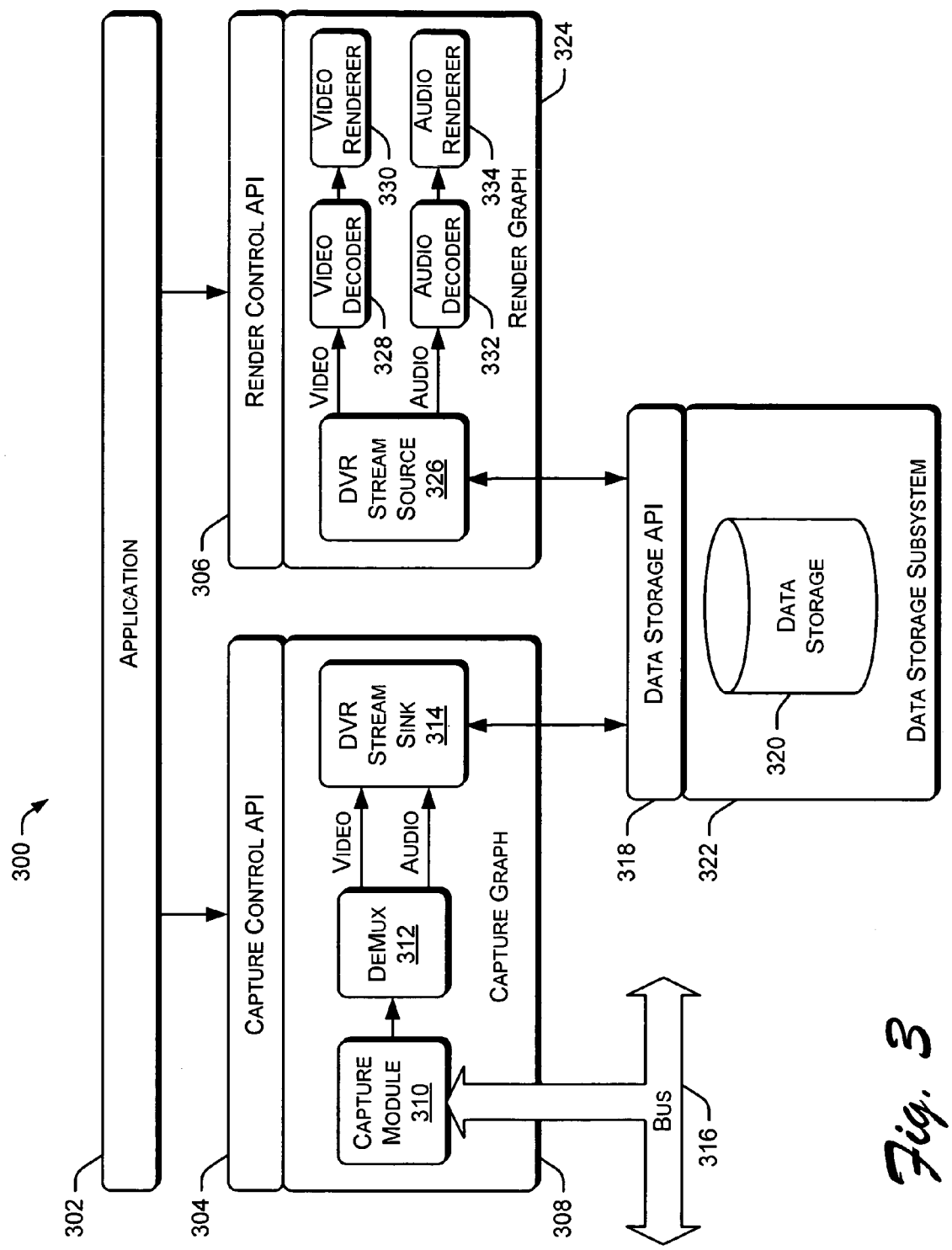
FIG. 3 illustrates a block diagram of a system having time shifting and DVR functionality.

FIG. 3 illustrates a block diagram of a system 300 having time shifting and digital recording functionality. All or part of system 300 may be contained in a set top box, cable box, VCR, digital television recorder, personal computer, game console, or other device. An application 302 communicates with a capture control API 304 and a render control API 306. For example, application 302 may send "start", "stop", or "tune" instructions to capture control API 304. Similarly, application 302 may send "seek", "skip", "rewind", "fast forward", and "pause" instructions to render control API 306. In one embodiment, application 302 controls various time shifting and digital recording functions based on user input, pre-programmed instructions, and/or predicted viewing habits and preferences of the user.

Capture control API 304 communicates with a capture graph 308, which includes a capture module 310, a demultiplexer 312, and a DVR stream sink 314. Capture graph 308 is a type of DirectShow® filter graph that is associated with broadcast streams. DirectShow® is a multimedia streaming specification consisting of filters and COM interfaces. DirectShow® supports media playback, format conversion, and capture tasks. DirectShow® is based on the Component Object Model (COM). A filter is a unit of logic that is defined by input and output media types and is configured and/or queried via COM interfaces. A filter graph is a logical grouping of connected DirectShow® filters. Filters are run, stopped, and paused as a unit. Filters also share a common clock.

Capture graph 308 is a type of DirectShow® filter graph that is associated with broadcast streams. Capture module 310 receives broadcast data streams via a bus 316, such as a universal serial bus (USB). The broadcast stream received by capture module 310 is provided to demultiplexer 312, which separates the broadcast stream into separate components, such as a video component and an audio component. The separate components are then provided to DVR stream sink 314, which communicates with a data storage subsystem 322 through a data storage API 318. Data storage subsystem 322 includes one or more data storage devices 320 for storing various information, including temporary and permanent data associated with one or more broadcast streams.

Render control API 306 communicates with a render graph 324, which includes a DVR stream source 326, a video decoder 328, a video renderer 330, an audio decoder 332, and an audio renderer 334. Render graph 324 is another type of DirectShow® filter graph that is associated with broadcast streams. DVR stream source 326 communicates with data storage subsystem 322 through data storage API 318 to retrieve stored broadcast stream data from data storage device 320. The video component of the data retrieved by DVR stream source is provided to video decoder 328 and the audio component of the data is provided to audio decoder 332. Video decoder decodes the video data and provides the decoded video data to video renderer 330. Audio decoder 332 decodes the audio data and provides the decoded audio data to audio renderer 334. Video renderer 330 displays or otherwise renders video data and audio renderer 334 plays or otherwise renders the audio data.

Time shifting and DVR recording require a backing storage device, such as a hard disk drive. Typically, data is written to one or more files on the hard disk drive. Content is written to the file and later (or concurrently), the content is read back out of the file to be decoded and rendered. This backing storage device is useful because a system's core memory is generally insufficient to temporarily store high-speed multimedia content for an arbitrary duration.

Figure 4:
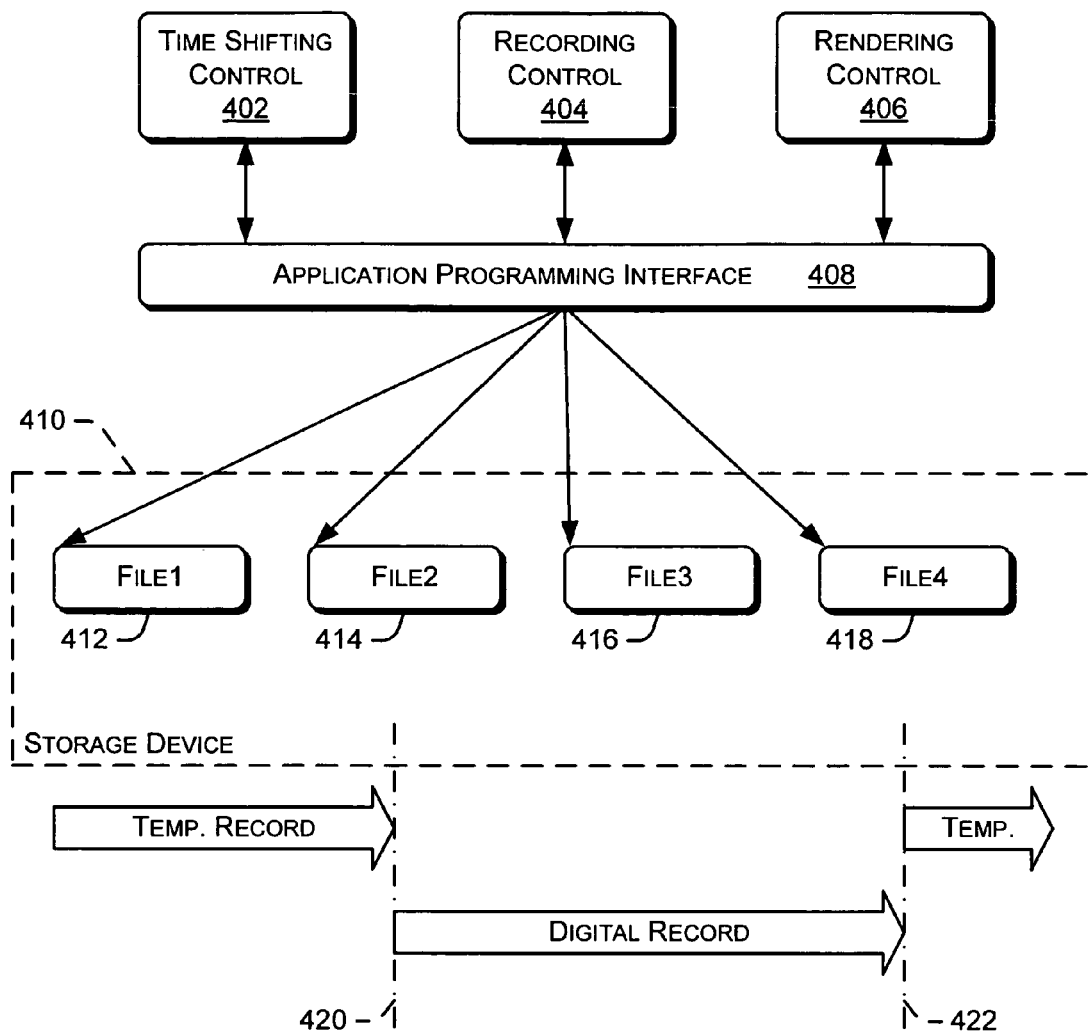
FIG. 4 illustrates the storage of time shifted data and recorded data on a storage device.

FIG. 4 illustrates the storage of time shifted data and recorded data on a storage device. A time shifting control 402, a recording control 404, and a rendering control 406 are coupled to an API 408, which allows the controls 402-406 to interact with data stored on a storage device 410, such as a hard disk drive. As shown in FIG. 4, storage device 410 includes four media files 412, 414, 416, and 418, labeled "File1", "File2", "File3", and "File4", respectively. In one implementation, each media file 412-418 stores the same amount of content, such as a particular number of bytes of data or a particular number of minutes of a broadcast program. Alternatively, different media files may store different amounts of content.

The time shifting control 402 receives commands from a user related to time shifting broadcast data and communicates the appropriate instructions to the API 408, which causes the appropriate media files to be created. The recording control 404 receives digital recording commands from a user and communicates the appropriate instructions to the API 408, which causes the appropriate data to be permanently recorded to one or more media files. The rendering control 406 receives rendering commands from a user and communicates the appropriate instructions to the API 408, which causes the requested data to be retrieved from one or more media files and rendered according to the user's instructions.

Each media file 412-418 may store time shifted data, digitally recorded data, or a combination of both, depending on the commands received from the time shifting control 402 and the recording control 404. For example, a time shifting command may cause the system to begin storing a data stream (as temporary time shifted data) at the beginning of media file 412. This storing of data continues until file 412 is "full"; i.e., has reached the storage limit set by the system. In this example, the storage limit is ten minutes of broadcast data. The storing of data then continues at the beginning of file 414, and continues until a time indicated by broken line 420. At that time, the user has indicated that the broadcast data is to be digitally recorded for permanent storage. The user may have activated the recording operation at the time indicated by line 420, or may have previously programmed the system to record at that particular time. The digitally recorded data is stored in the same media file 414, contiguous with the previously stored time shifted data.

The storing of the data continues until media file 414 is full, then continues to the next media file (416), then to the next media file (418). At a time indicated by broken line 422, the user has indicated that the digital recording of the broadcast data should stop. At this time, the system continues recording the broadcast data in media file 418 as temporary time shifted data. Thus, the four media files 412-418 shown in FIG. 4 store a single continuous stream of broadcast data, although certain portions of the data are identified as temporary time shifted data and other portions of the data are identified as permanent digitally recorded data. A metafile, discussed below, is used to reference the various media files that make up the stream of broadcast data.

In an alternate embodiment, the media files are flexible in size. In this embodiment, media file 414 is closed at the time indicated by broken line 420 and a new media file (media file 416) is used to store the digitally recorded data. Media file 416 stores the program data until the time indicated by broken line 422, when a different media file (media file 418) continues recording the broadcast as a temporary recording. This embodiment segregates temporary files from permanent files, but provides a unified time shifting and digital recording mechanism. This unified time shifting and digital recording mechanism allows the user to seek or to skip over any portion of the broadcast that has been stored, regardless of whether that portion of the broadcast has been digitally recorded or time shifted. Using a separate file for digital recordings allows that separate file to be shared and distributed more easily than a recording that spans multiple files.

Figure 5:
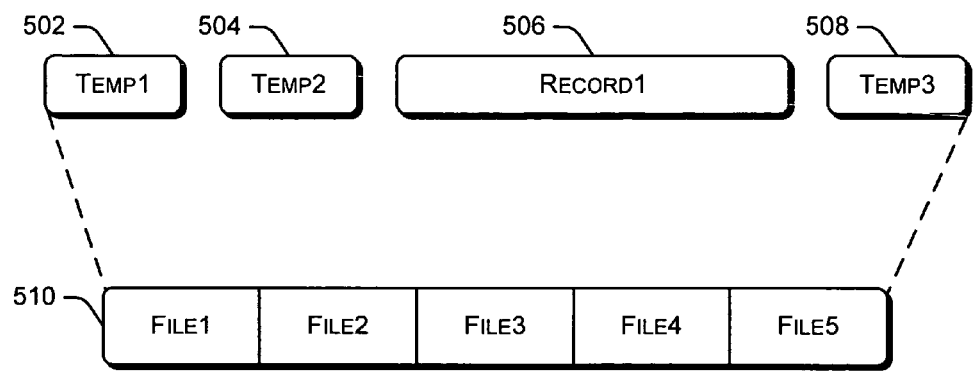
FIGS. 5 and 6 illustrate example metafiles that include both time shifted data and recorded data.
Figure 6:
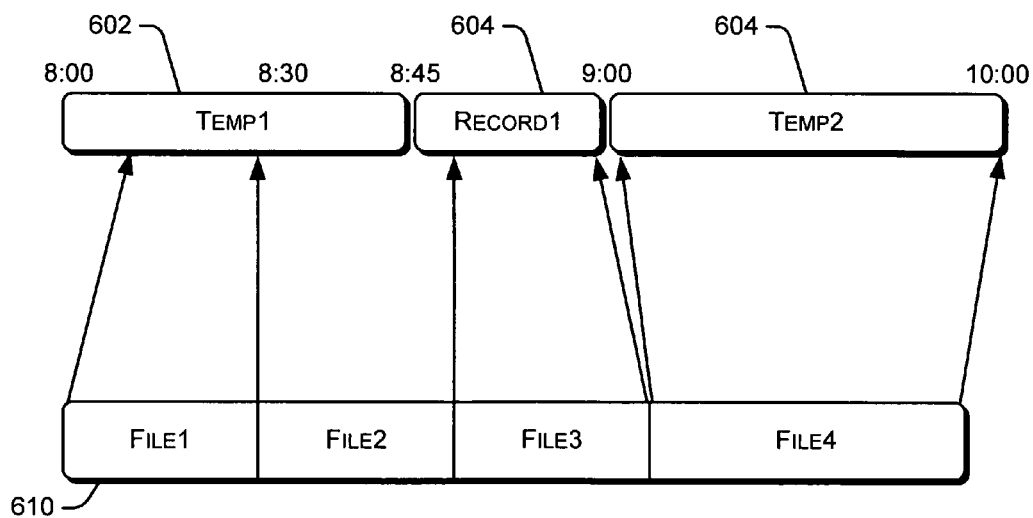

FIGS. 5 and 6 illustrate example metafiles that include both time shifted data and digitally recorded data. Referring to FIG. 5, a stream of broadcast data includes two time shifted data portions 502 and 504, followed by a recorded data portion 506, which is followed by another time shifted data portion 508. These four portions 502-508 are stored as five media files (labeled "File1", "File2", "File3", "File4", and "File5") referenced by a metafile 510. Each of the five media files in metafile 510 stores a part of one or more data portions 502-508. The metafile 510 includes pointers to the data portions associated with each file referenced in the metafile. A particular metafile may contain any number of data portions from one or more broadcast data streams.

Referring to FIG. 6, a stream of broadcast data includes a time shifted data portion 602, followed by a recorded data portion 604, which is followed by another time shifted data portion 606. The approximate start and end times associated with each portion are illustrated. A metafile 610 includes multiple file references ("File1", "File2", "File3", and "File4") that correspond to media files associated with the three broadcast data portions 602-606.

In the example of FIG. 6, the data stream is a television broadcast and a user begins viewing the broadcast at approximately 8:30, when a new program starts. At 8:30, the system is recording the broadcast data as temporary time shifted data. However, at 8:45, the user decides that they want to record the entire program for future viewing by themselves or another member of the household. Although fifteen minutes of the program have already been displayed to the user, the metafile associated with the broadcast can modify the status of the time shifted data recorded between 8:30 and 8:45. The status of this data is changed to recorded data. At this point, a second metafile is created, which is associated with the recorded data. This second metafile continues to be updated until the end of the recording (9:00).

Since the time shifted data and the recorded data is stored contiguously in the media files, there is no delay or interruption in the rendering of data when switching between temporary time shifted data and recorded data. A user viewing the live broadcast stream can seek or jump back into the recorded data and the time shifted data sections (by pausing the live viewing and rewinding) without any delay or interruption. Similarly, when the user plays back the recorded program (either while the recording is in progress or after the recording has completed), there is no interruption of the playback fifteen minutes into the program where the record command was executed by the user. Thus, the system allows a user to record an entire program after viewing some or all of the program. This is referred to as "post-recording".

Additionally, the use of two metafiles allows the system to utilize the first metafile when rendering the live broadcast and the second metafile when rendering the recorded program. Although two different metafiles are maintained, the system can seamlessly switch between metafiles in response to stored data and user commands.

Figures 7A, 7B:
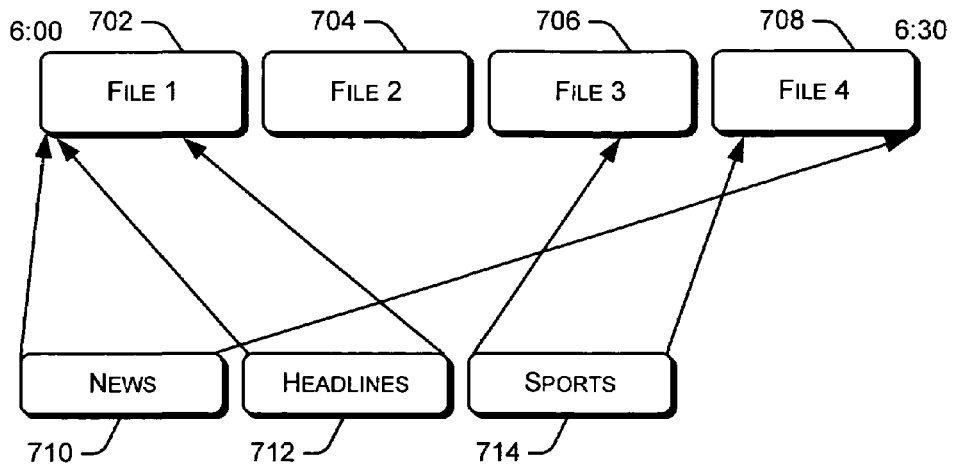
FIGS. 7A and 7B illustrate multiple overlapped metafiles associated with the same television broadcast program.

FIGS. 7A and 7B illustrate multiple overlapped metafiles associated with the same television broadcast program. With reference to FIG. 7A, the television broadcast (a news program) begins at 6:00 and ends at 6:30. The television broadcast is stored using four media files 702, 704, 706, and 708, each of which stores 7½ minutes of the television broadcast. Three separate metafiles 710, 712, and 714 are associated with the television broadcast. Metafile 710 represents the entire news program (i.e., the entire television broadcast between 6:00 and 6:30). Metafile 712 is associated with the headlines portion of the news program (from 6:00 until approximately 6:05). Metafile 714 is associated with the sports portion of the news program (from approximately 6:20 until approximately 6:24). Each metafile includes pointers to the appropriate media files and particular times within each media file that represent the relevant portion of the television broadcast. Although the three metafiles 710, 712, and 714 contain overlapping content, the actual television broadcast data is only stored once, using media files 702, 704, 706, and 708. Thus, multiple different metafiles can be associated with the same data stream without requiring duplicate copies of any portion of the data stream.

Referring to FIG. 7B, example pointer information associated with each metafile 710, 712, and 714 is shown. Metafiles 710, 712, and 714 may be referred to as a group of metafiles 720 associated with a particular television broadcast. Each metafile includes a first offset and a second offset, each of which is associated with a particular media file. Each offset refers to the number of minutes from the beginning of the associated media file. For example, metafile 710 has a first pair of offset values (0.0 and 7.5) associated with File1 (reference 722). "0.0" refers to the beginning of the associated media file and "7.5" refers to the end of the associated media file. Metafile 710 has a second pair of offset values (0.0 and 7.5) associated with File2 (reference 724). Metafile 710 also has a third pair of offset values (0.0 and 7.5) associated with File3 (reference 726). Additionally, metafile 710 includes a fourth pair of offset values (0.0 and 7.5) associated with File4 (reference 728). Thus, the first metafile 710 begins at the beginning of File1 and includes all of File1, File2, File3, and File4, ending at the end of File4.

Similarly, for metafile 712, the first offset value (0.0) points to the beginning of File1 and the second offset value (5.6) points to a location 5.6 minutes into File1. Thus, metafile 712 is associated with a 5.6 minute portion of the television broadcast. Metafile 714 includes a first offset value (5.0) associated with File3 that points to a location five minutes into File3 and a second offset value (7.5) that points to the end of File3. Additionally, metafile 714 includes a second pair of offset values that are associated with File4. The first offset value (0.0) points to the beginning of File4 and the second offset value (1.5) points to a location 1.5 minutes into File4. Although FIGS. 7A and 7B illustrate three different metafiles associated with a television broadcast, any number of metafiles can be associated with any type of data stream.

In one implementation, the broadcast data stream is stored and read by the DirectShow filter graphs by using the services of the Data Storage API. This allows the DirectShow reader, writer, and time shift filter graphs to view the broadcast data stream as a continuous timeline. This also allows the time shifted data and the digitally recorded data to be handled in a uniform manner.

Figure 8:
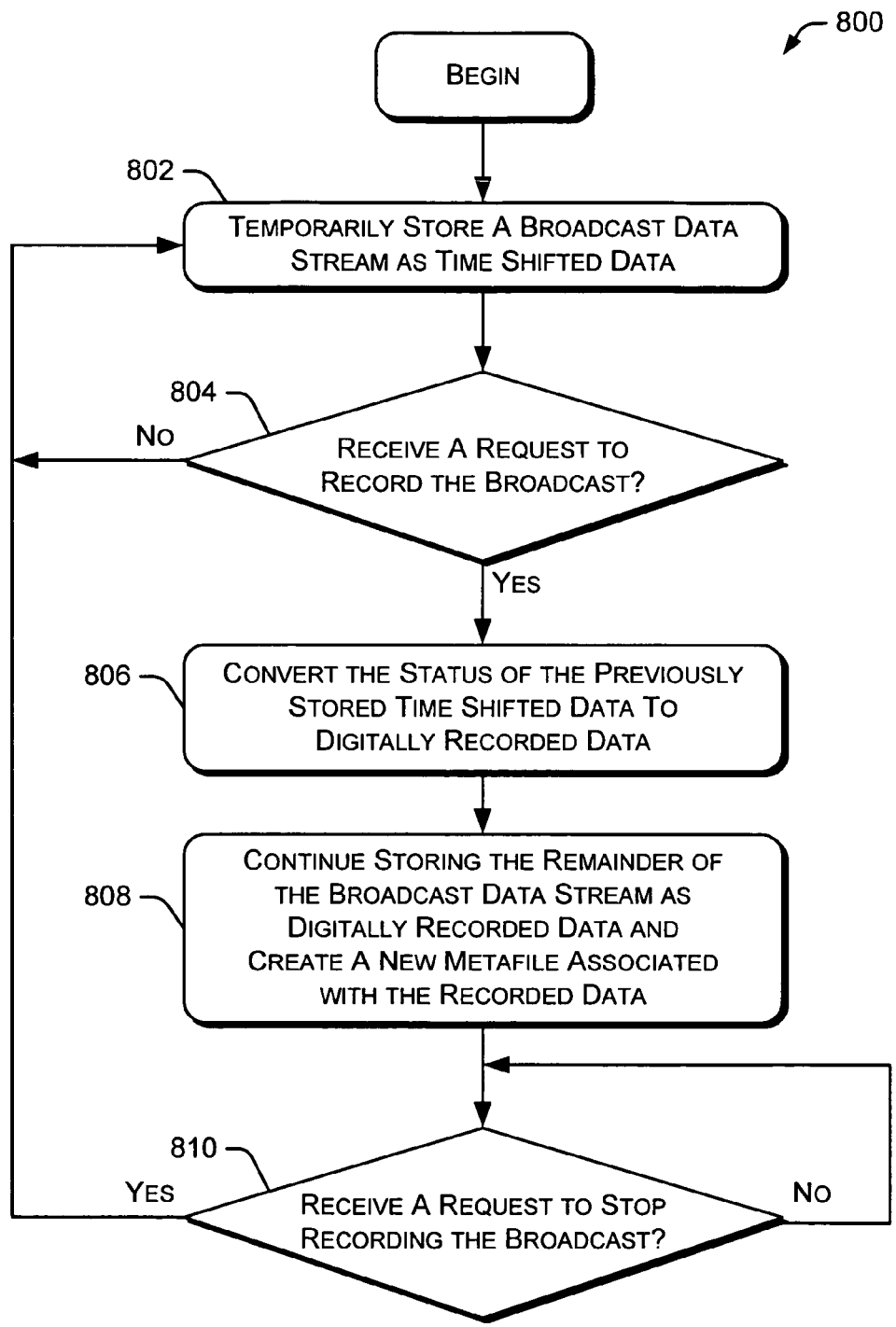
FIG. 8 is a flow diagram illustrating a procedure for post-recording time shifted data.

FIG. 8 is a flow diagram illustrating a procedure 800 for post-recording time shifted data. Initially, the procedure begins storing a broadcast data stream as temporary time shifted data (block 802). The procedure then determines whether a request to record the broadcast has been received (block 804). If no request to digitally record the broadcast is received, the procedure continues storing the received broadcast stream as time shifted data at block 802.

If a request to digitally record the entire broadcast is received at block 804, the procedure 800 converts the status of the previously stored time shifted data to digitally recorded data (block 806). Additionally, the procedure creates a new metafile associated with the recorded data. The procedure then continues storing the remainder of the broadcast data stream as digitally recorded data (block 808). At block 810, the procedure determines whether a request to stop recording the broadcast has been received. If not, the procedure continues digitally recording the broadcast data stream. If a request to stop recording the broadcast is received, the procedure returns to block 802 to continue recording the broadcast data stream as time shifted data. This is an example of post-recording time shifted data. If a command is received to pause recording, the procedure stops recording the data stream until a command is received to continue recording; however, the broadcast data stream received while recording is paused continues to be saved as time shifted data. The pause function allows a user to filter out particular content, such as commercials or other unwanted data.

In a particular implementation, two or more data streams may be recorded simultaneously. In this implementation, each recorded data stream is stored in a separate permanent file.

Figure 9:
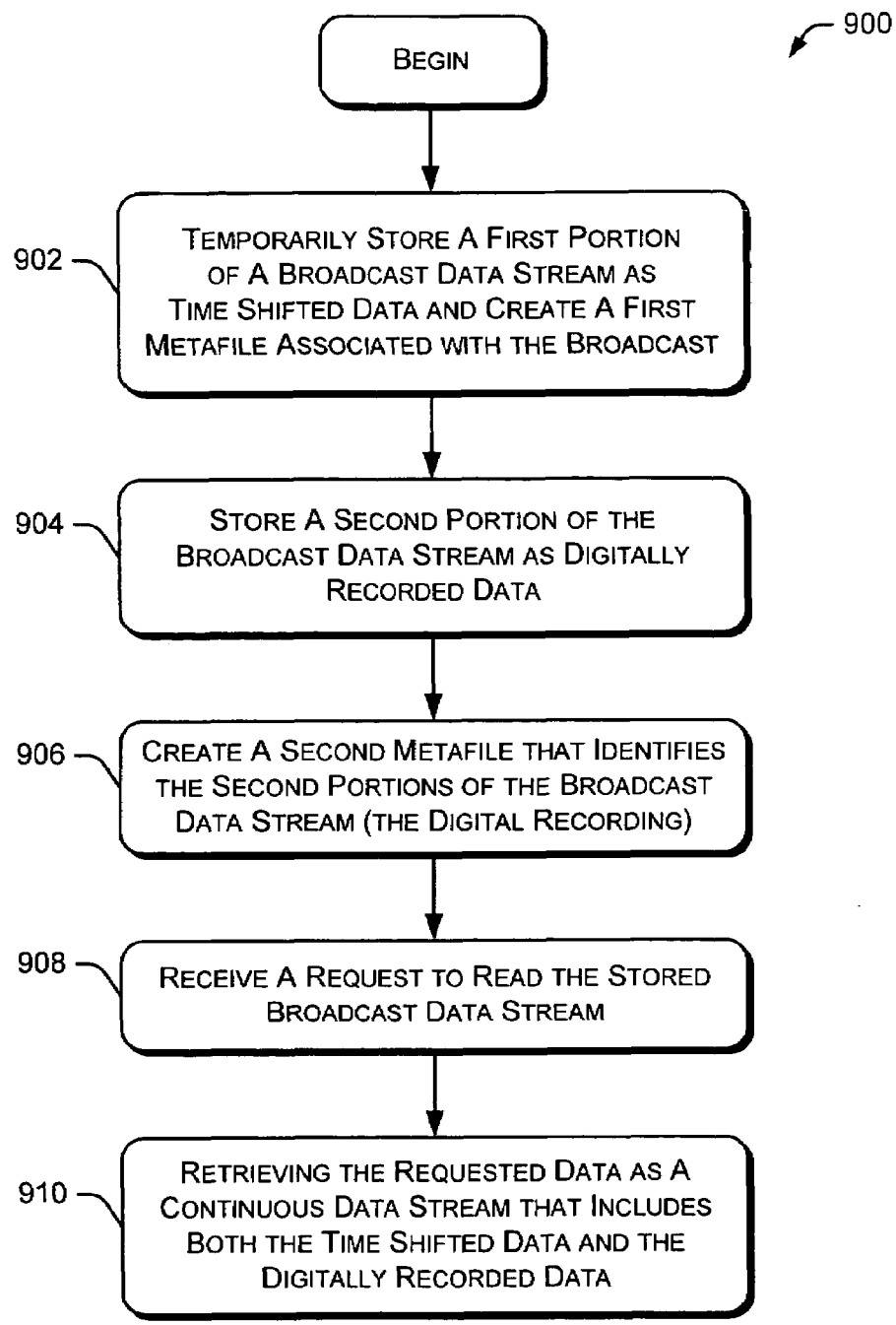
FIG. 9 is a flow diagram illustrating a procedure for creating a metafile including time shifted data and recorded data, and retrieving a continuous data stream using information in the metafile.

FIG. 9 is a flow diagram illustrating a procedure 900 for creating metafiles associated with time shifted data and recorded data, and retrieving a continuous data stream using information in the metafiles. Initially, the procedure begins storing a first portion of a broadcast data stream as temporary time shifted data and creating a first metafile associated with the broadcast (block 902). The procedure then stores a second portion of the broadcast data stream as digitally recorded data (block 904). For example, the procedure may change to storing the data as digitally recorded data in response to a user command (or a pre-programmed command) to record the broadcast data stream.

Procedure 900 creates a second metafile associated with the second portion (i.e., the digital recording) of the broadcast data stream (block 906). For example, the metafiles may be of the type discussed above with respect to FIGS. 7A and 7B. At block 908, the procedure receives a request to read the stored broadcast data stream. This request may be received while the broadcast data stream is still being recorded or after the recording has finished. The procedure then retrieves the requested data as a continuous data stream that includes both the time shifted data and the digitally recorded data (block 910). In this example, the original broadcast data stream is recreated by reading both time shifted data and digitally recorded data from a storage device. The two metafiles are used to identify the starting and ending points of the broadcast data stream as well as the individual portions of the data stream (e.g., the portion stored as time shifted data and the portion stored as digitally recorded data). For example, there may be two different commands—one command associated with each of the two metafiles. A first command, "view the live broadcast", uses the first metafile to access the time shifted data. A second command, "view the recording", uses the second metafile to access the digitally recorded data.

The separation of the recorded data stream into multiple portions and/or multiple media files is transparent to the user of the system. Additionally, the contents of the metafiles is transparent to the user.

To seamlessly unify time shifting and digital recording, a writer creates a ring buffer object, associates a name with the object, and writes to the object. The object saves this data to the appropriate data storage files. Readers that want to access the broadcast data live open this object for reading and retrieve the captured broadcast data.

To create a recording, a writer creates a recording object, sets the name of the disk file by which the user identifies the recording, and associates the recording object with a ring buffer object. The writer issues start and stop recording commands on the recording object. These commands identify the beginning and end of the program to be recorded. The writer writes to the ring buffer object instead of the recording object. Readers can open a digital recording by supplying the corresponding file name, either while the recording is in progress or after the recording has terminated. Readers retrieve the broadcast data by calling into, for example, the Data Storage API.

Each metafile contains a list of program segments. Each segment is characterized by a link to the media file that contains the program data for that segment, and the starting and ending offsets in that media file. Program segments can skip over portions of media files (e.g., to skip over commercials).

To allow readers to access ring buffers (i.e., live broadcast streams) and digital recordings in a uniform manner, the Data Storage API represents digital recordings and ring buffers using metafiles that are saved on a storage device such as a hard disk drive. The actual broadcast data is saved to one or more media files. The metafiles and the media files corresponding to ring buffers are temporary (i.e., they are deleted when the ring buffer object is destroyed).

A file management component keeps track of the number of metafiles that reference each media file and uses this information to determine whether a media file corresponds to a temporary ring buffer or a permanent digital recording. This information persists in a permanent store such that it remains available after the time shifting and digital recording application terminates. This allows the system to "clean up" media files when all associated digital recordings that refer to them have been deleted.

FIG. 10 illustrates an example of a suitable operating environment in which the systems and methods described herein may be implemented. The illustrated operating environment is only one example of a suitable operating environment and is not intended to suggest any limitation as to the scope of use or functionality of the invention. Other well-known computing systems, environments, and/or configurations that may be suitable for use with the invention include, but are not limited to, personal computers, server computers, hand-held or laptop devices, multiprocessor systems, microprocessor-based systems, programmable consumer electronics, gaming consoles, cellular telephones, network PCs, minicomputers, mainframe computers, distributed computing environments that include any of the above systems or devices, and the like.

FIG. 10 shows a general example of a computer 1042 that can be used in accordance with the invention. Computer 1042 is shown as an example of a computer that can perform the various functions described herein. Computer 1042 includes one or more processors or processing units 1044, a system memory 1046, and a bus 1048 that couples various system components including the system memory 1046 to processors 1044.

The bus 1048 represents one or more of any of several types of bus structures, including a memory bus or memory controller, a peripheral bus, an accelerated graphics port, and a processor or local bus using any of a variety of bus architectures. The system memory 1046 includes read only memory (ROM) 1050 and random access memory (RAM) 1052. A basic input/output system (BIOS) 1054, containing the basic routines that help to transfer information between elements within computer 1042, such as during start-up, is stored in ROM 1050. Computer 1042 further includes a hard disk drive 1056 for reading from and writing to a hard disk, not shown, connected to bus 1048 via a hard disk drive interface 1057 (e.g., a SCSI, ATA, or other type of interface); a magnetic disk drive 1058 for reading from and writing to a removable magnetic disk 1060, connected to bus 1048 via a magnetic disk drive interface 1061; and an optical disk drive 1062 for reading from and/or writing to a removable optical disk 1064 such as a CD ROM, DVD, or other optical media, connected to bus 1048 via an optical drive interface 1065. The drives and their associated computer-readable media provide nonvolatile storage of computer readable instructions, data structures, program modules and other data for computer 1042. Although the exemplary environment described herein employs a hard disk, a removable magnetic disk 1060 and a removable optical disk 1064, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 1060, optical disk 1064, ROM 1050, or RAM 1052, including an operating system 1070, one or more application programs 1072, other program modules 1074, and program data 1076. A user may enter commands and information into computer 1042 through input devices such as keyboard 1078 and pointing device 1080. Other input devices (not shown) may include a microphone, joystick, game pad, satellite dish, scanner, or the like. These and other input devices are connected to the processing unit 1044 through an interface 1068 that is coupled to the system bus (e.g., a serial port interface, a parallel port interface, a universal serial bus (USB) interface, etc.). A monitor 1084 or other type of display device is also connected to the system bus 1048 via an interface, such as a video adapter 1086. In addition to the monitor, personal computers typically include other peripheral output devices (not shown) such as speakers and printers.

Computer 1042 operates in a networked environment using logical connections to one or more remote computers, such as a remote computer 1088. The remote computer 1088 may be another personal computer, a server, a router, a network PC, a peer device or other common network node, and typically includes many or all of the elements described above relative to computer 1042, although only a memory storage device 1090 has been illustrated in FIG. 10. The logical connections depicted in FIG. 10 include a local area network (LAN) 1092 and a wide area network (WAN) 1094. Such networking environments are commonplace in offices, enterprise-wide computer networks, intranets, and the Internet. In certain embodiments, computer 1042 executes an Internet Web browser program (which may optionally be integrated into the operating system 1070) such as the "Internet Explorer" Web browser manufactured and distributed by Microsoft Corporation of Redmond, Wash.

When used in a LAN networking environment, computer 1042 is connected to the local network 1092 through a network interface or adapter 1096. When used in a WAN networking environment, computer 1042 typically includes a modem 1098 or other means for establishing communications over the wide area network 1094, such as the Internet. The modem 1098, which may be internal or external, is connected to the system bus 1048 via a serial port interface 1068. In a networked environment, program modules depicted relative to the personal computer 1042, or portions thereof, may be stored in the remote memory storage device. It will be appreciated that the network connections shown are exemplary and other means of establishing a communications link between the computers may be used.

Computer 1042 typically includes at least some form of computer readable media. Computer readable media can be any available media that can be accessed by computer 1042. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 1042. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The methods and systems described herein provide support for the following situations.

In this example, a user is watching live television using Tuner 1. The writer creates a ring buffer object corresponding to Tuner1 and writes to it. The writer specifies the size of the ring buffer when it creates the ring buffer object. The I/O layer creates a temporary metafile for the ring buffer object and limits the number of temporary media files that this metafile may reference. To watch live television, a reader opens the ring buffer object corresponding to Tuner1, retrieves the multimedia data and communicates the data to a DirectShow graph to render the data. Readers would be able to live pause without affecting the writer, i.e., the writer would continue to write the captured stream to the ring buffer object. Readers would also be able to seek or jump to different points in program. When the writer stops writing, the ring buffer stops growing. The media files and the ring buffer's metafile, however, are not deleted until the reader also closes the ring buffer object. So, the reader can continue to read the media files.

To create a digital recording using Tuner 1, the writer creates a ring buffer object corresponding to Tuner1 and writes to it. The writer then creates a recording object and creates a disk file, such as Program1.dvr, to allow the user to identify the recording. The writer then issues start recording and end recording commands on the recording object to identify the beginning and the end of the program. In one implementation, the I/O layer creates two metafiles, one for the ring buffer corresponding to Tuner1, and the other for the digital recording. The data written by the writer is written only once to the media files. However, these media files are associated with both metafiles (for the data that falls within the recorded interval) and can be accessed via either metafile. The I/O layer marks the media files referenced by the recording metafile as being permanent and does not delete them when the ring buffer object is destroyed.

To view a digital recording, the reader opens the metafile corresponding to the recording (e.g., Program1.dvr) and reads content from it. The reader can pause the viewing and seek or jump to different parts of the program. When the reader reaches the end of the file, the viewing terminates. Note that Program1.dvr may be in the process of being recorded when the reader opens the file.

To create post-recordings, the writer can specify a start or stop recording time "in the past". This allows the end-user to start watching live TV and then record a show that has just been viewed. If this data is still in the ring buffer, the metafile for Program1.dvr can reference it. When the writer finishes and destroys the ring buffer object, the media files containing the data beyond the start recording time are not deleted because a digital recording references these files.

To create overlapping recordings, the writer is permitted to open multiple recording objects and specify overlapping recording intervals. The I/O layer creates the multiple metafiles, which reference the same set of media files. Thus, overlapping recordings can be created without copying multimedia data. This allows a user, for example, to access the entire program through one recording and highlights of the program through another.

To pause and resume recording, the writer is allowed to pause and resume recordings specifying any time between the start and stop recording times. Note that the pause and resume recording commands can, like the start and stop recording commands, be issued after the fact, i.e., they can refer to times in the past. The I/O layer creates new segments in the metafile to skip over sections of media data while recording is paused. Any reader that is viewing TV live (by opening the ring buffer object for Tuner1) is unaffected by the pause and resume recording commands that are issued on an associated recorder. The pause and resume recording feature is useful to filter unwanted portions of the program or to link together non-contiguous sections of programs into a single recording that contains, for example, a program's highlights.

For purposes of illustration, programs and other executable program components such as the operating system are illustrated herein as discrete blocks, although it is recognized that such programs and components reside at various times in different storage components of the computer, and are executed by the data processor(s) of the computer.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   storing a portion of a broadcast program as time shifted data;
   retrieving and displaying the time shifted data;
   receiving a request to record the broadcast program as recorded data after a portion of the time shifted data has been stored; and
   recording the broadcast program,
   wherein recording the broadcast program includes modifying a metafile to indicate that the time shifted data associated with the broadcast program is recorded data, wherein the metafile references media files that make up at least a portion of the broadcast program, and wherein two or more metafiles can be associated with different portions of the broadcast program, and wherein at least some metafiles can overlap with other metafiles by referencing overlapping content from referenced media files.

2. A method as recited in claim 1 wherein recording the broadcast program includes recording the portion of the broadcast program associated with the time shifted data.

3. A method as recited in claim 1 wherein recording the broadcast program includes converting the time shifted data associated with the broadcast program to recorded data.

4. A method as recited in claim 1 wherein recording the broadcast program includes creating a metafile associated with the recorded data.

5. A method as recited in claim 1 wherein storing a portion of the broadcast program as time shifted data includes creating a metafile associated with the time shifted data.

6. A method as recited in claim 1 further comprising recording a remainder of the broadcast program as recorded data.

7. One or more computer-readable memories containing a computer program that is executable by a processor to perform the method recited in claim 1.

8. A method as recited in claim 1 further comprising maintaining a metadata file that includes a reference to at least one file that stores the time shifted data, the metadata file further including a reference to a file that stores the recorded broadcast program.

9. A method as recited in claim 8 further comprising modifying the reference to the at least one file that stores the time shifted data when the receiving a request is made.

10. A method as recited in claim 9 wherein the reference is modified to indicate the at least one file that stores the time shifted data now includes recorded data.

* * * * *